June 20, 1967 P. J. MAZZIOTTI 3,326,063
DIFFERENTIAL TRANSMISSION INCLUDING THEREIN A
RESILIENTLY PRELOADED MULTIPLE DISK CLUTCH
Filed July 10, 1964 3 Sheets-Sheet 1

FIG. I

INVENTOR.
PHILIP J. MAZZIOTTI
BY Walter E. Pavlick
Harold D. Shall
ATTORNEYS

INVENTOR.
PHILIP J. MAZZIOTTI
BY Walter E. Pavlick
Harold D. Shall
ATTORNEYS

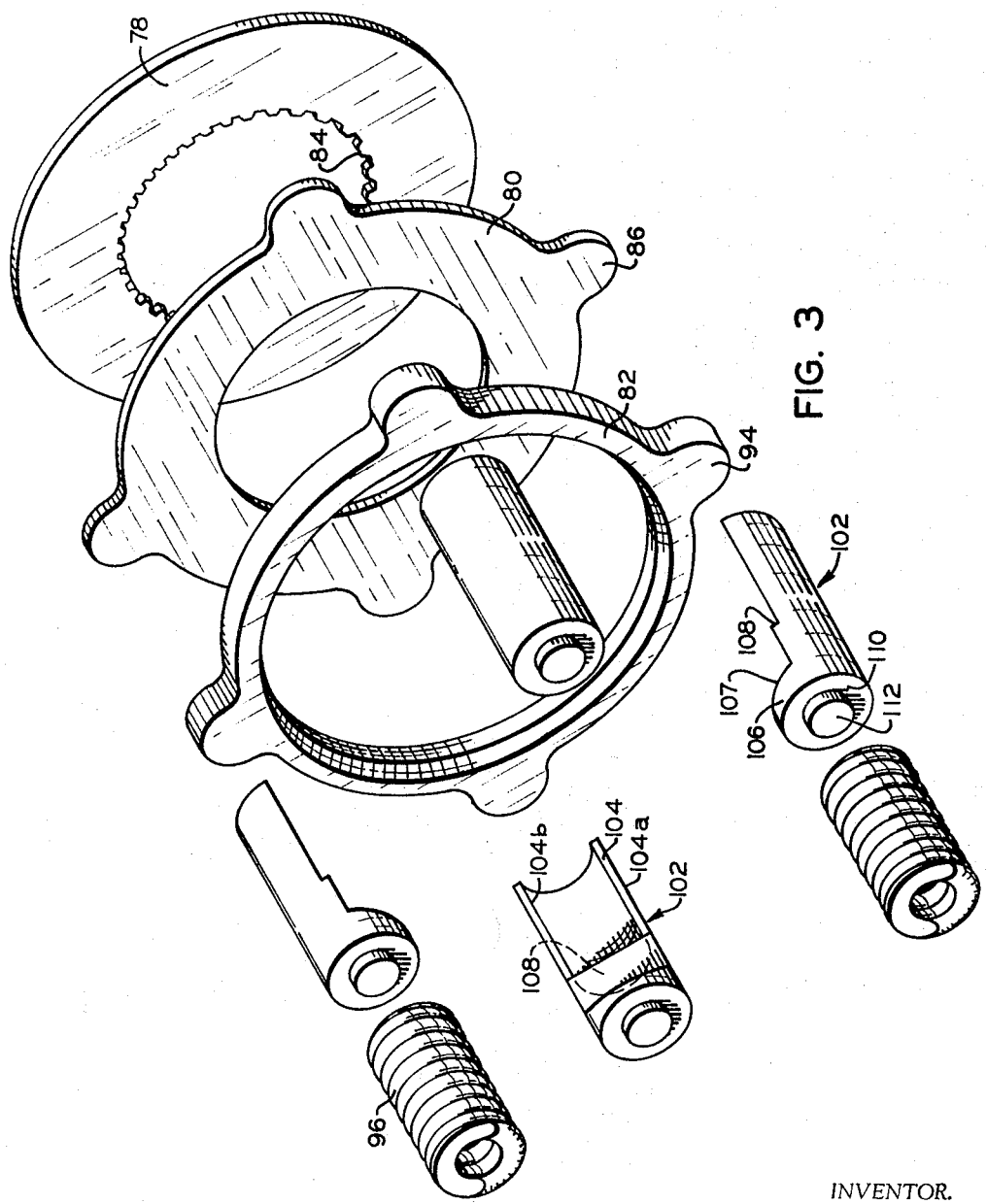

United States Patent Office 3,326,063
Patented June 20, 1967

3,326,063
DIFFERENTIAL TRANSMISSION INCLUDING THEREIN A RESILIENTLY PRELOADED MULTIPLE DISK CLUTCH
Philip J. Mazziotti, Toledo, Ohio, assignor to Dana Corporation, Toledo, Ohio, a corporation of Virginia
Filed July 10, 1964, Ser. No. 381,769
8 Claims. (Cl. 74—711)

This invention relates generally to differential transmissions of the type having clutch means therein for inhibiting the differential action thereof, more commonly referred to as limited slip differentials, and more particularly to such differential transmissions having a resiliently loaded multiple disk clutch therein to inhibit the differential action thereof.

Limited slip differentials having resiliently loaded multiple disk clutches are well known in the art and have found widespread use as a substitute for the standard type of differential transmission, that is, the type wherein the differential action is uninhibited, when it is desired to have the input torque thereto more favorably distributed to the various elements driven by the differential. It is well known that a standard differential transmission having an input means and a pair of output means will transfer the available torque input thereto equally to the two output means; however, the torque capable of being transferred to the output means is limited at least by the resisting loads applied to the output means. Accordingly, if one of the output means is not subjected to a resisting load, no torque can be applied thereto, for torque requires a resistance. In such a condition, the other output means, since the torque output will always be equally divided between the output means, if it is subjected to a resisting load, is incapable of transferring torque thereto. During this described condition, the various components of the differential transmission will freely differentiate relative to each other. By limiting the differential action of the components of the differential transmission, a greater amount of available torque may be transferred by the output means which is being subjected to a resisting load. It is for this purpose that the multiple disk clutch in a limited slip differential has been provided to inhibit the free differentiation of the components of the differential.

One common type of limited slip differential includes a housing, adapted to have torque applied thereto by a suitable input means, containing the usual side gears and pinion gears. A multiple disk clutch is disposed between at least one of the side gears and the housing, with some of the disks of the clutch being keyed to the housing and the others being keyed to the side gear. Resilient means are normally provided to impose a biasing load upon the multiple disk clutch thereby engaging the same so that the side gear is clutched to the differential housing. Since the side gears are the output means of the differential transmission, and must be rotatable about their axis and relative to the housing in order to freely differentiate, by clutching the side gear to the housing, differentiation of the components of the differential is inhibited so that more available torque can be transmitted by the pinion gears to the side gear which is subjected to the higher resisting load.

The above mentioned resilient means has taken many forms. One such form, as shown in United States Patent 2,821,096, discloses resilient means disposed between the side gears and engaging the same so that the side gears are urged axially outwardly to compress the multiple disk clutch between the same and the housing. This form is desirable in the respect that a one-piece differential housing may be utilized and the parts assembled therein through openings cut in the the periphery of the housing, but has an undesirable feature in that the resilient load causes a separation of the side gear and the pinion gear teeth thereby interfering with the proper meshing thereof. Further no means pilots the resilient means from rotating relative to the housing and the clutch members. Another form of the resilient means is disclosed by the type of limited slip differential wherein a Belleville spring is disposed axially outwardly of the side gear and engages a shoulder on the case and imposes its resilient load upon the multiple disk clutch independent of the side gear so that its load does not interfere with the meshing of the pinion and side gear teeth. However, such a differential must be formed with a two-piece housing so that the components of the differential can be assembled therein, since the Belleville spring and the multiple disk clutch must be inserted behind the shoulder against which the Belleville spring abuts.

Another prior art embodiment of such a differential, as shown in United States Patent No. 1,750,981, discloses the resilient means disposed radially intermediate the side gears and means connecting the resilient means to the clutch so that the resilient means loads the clutch independently of the side gears. However, the connecting means does not pilot the resilient means against rotation relative to the housing or the clutch nor does it prevent rotation of one end of the resilient means relative to the other end. Additionally, there is no means for increasing the loading on the clutch.

Another form of such a resiliently loaded limited slip differential, as shown in United States Patent No. 2,966,076, discloses a plurality of resilient means disposed peripherally of the side gears and engaging the multiple disk clutch and imposing its biasing load thereto independently of the side gears so that its resilient load is not imposed upon the side gears to interfere with the meshing thereof. This type of resilient loading is also desirable in that it allows the utilization of a one-piece housing accompanied by easy assembly of the component parts therein.

This invention is directed more particularly to improvements in the type of resilient loaded limited slip differential of the latter described type, which improvements include providing a pilot means whereby at least a portion of the resilient means may be disposed radially intermediate the side gears so that the differential housing need not be relieved to accommodate the same, which pilot means also pilots the resilient means and maintains the same from rotating relative to the housing or having portions thereof rotate relative to each other, which pilot means also imposes the load of the resilient means on the multiple disk clutch independently of the side gears and further pilots the portions of the multiple disk clutch so that the same will not rotate relative to the housing or to the resilient means, and, finally, the pilot means function to inhibit wear upon the differential housing by the various portions piloted thereby.

Normally the clutch disks mounted for rotation with the differential housing are of substantially annular configuration and include a plurality of driving keys extending radially from the periphery thereof. The portion of the differential housing receiving these disks is normally cylindrical and is provided with keyways or axially extending openings which receive the radially extending keys of the cooperating clutch disks. In the manufacture of the usual differential housing, such is preferably made both durably and inexpensively by casting. However, such casting method requires substantial machining to adapt the casting to receive the clutch disk, and by utilizing the usual production casting methods, the keyways cannot be cast to a suitable tolerance and finish to receive the cooperating keys. In addition, a great deal of wear is occasioned by the action of the keys of the clutch disk on the keyways of the housing. To overcome this wear problem, the keyways of the housing are often hardened. Inasmuch as the entire housing must be handled during such hardening treatment, and because of the inaccessible location of the keyways, the treatment is cumbersome and expensive.

Some prior art limited slip differentials disclose keyways which have not been hardened and which have been relatively easily machined, and which incorporate therein wear members between the keys of the multiple disk clutch and the keyways as shown in United States Patent No. 3,052,137; however, such members function solely as wear and piloting members for the clutch disks.

It is, therefore, an object of this invention to provide a limited slip differential transmission of the multiple disk clutch type wherein resilient means impose a biasing load on the clutch independently of the components of the gear train and wherein the differential housing does not require a portion thereof reduced to accommodate such an installed resilient means.

It is another object of this invention to provide a limited slip differential having the usual pinion and side gears, a multiple disk clutch disposed between the side gears and the differential housing and resilient means having at least a portion thereof disposed in the space intermediate the side gears, wherein means operatively connect the resilient means to the clutch so that the resilient means imposes its biasing effect on the clutch independently of the side gears and without imposing its biasing effect upon the side gears, which means is operative to pilot the resilient means from rotating relative to the clutch and the housing.

It is yet a further object of this invention to provide in such a differential having a multiple disk clutch therein and coil springs for initially loading the clutch, a pilot means which pilots some of the clutch members and the coil springs and inhibits the same from rotating relative to and wearing upon the differential housing and additionally transmits the biasing load of the springs to the clutch members.

It is a further object of this invention to provide a limited slip differential transmission of the multiple disk clutch type wherein means are provided to reduce wear of the housing which results from the action of the clutch disk disposed therein and wherein hardening of the portions of the housing cooperating with the clutch disks is eliminated.

Another objects of this invention is to provide economical and convenient methods of fabricating an inexpensive, durable and reliable limited slip differential transmission.

Yet a further object of this invention is to provide a limited slip differential having the usual pinion and side gears, a multiple disk clutch disposed between the side gears and the differential case and operative to be loaded by axially outward movement of the side gears in response to torque transmitted thereby and resilient means having at least a portion thereof disposed in the space intermediate the side gears, wherein means operatively connect the resilient means to the clutch so that the resilient means imposes its biasing effect on the clutch independently of the side gears and without imposing its biasing effect upon the side gears, and the side gears impose their biasing load upon the clutch independently of the resilient means.

Other and further objects of this invention will become apparent from the following description and claims and may be understood by references to the accompanying drawings which by way of illustration, show a preferred embodiment of the invention.

In the drawings:

FIG. 3 is an exploded isometric view showing selected portions of the clutch shown in FIG. 1.

Figure 1:
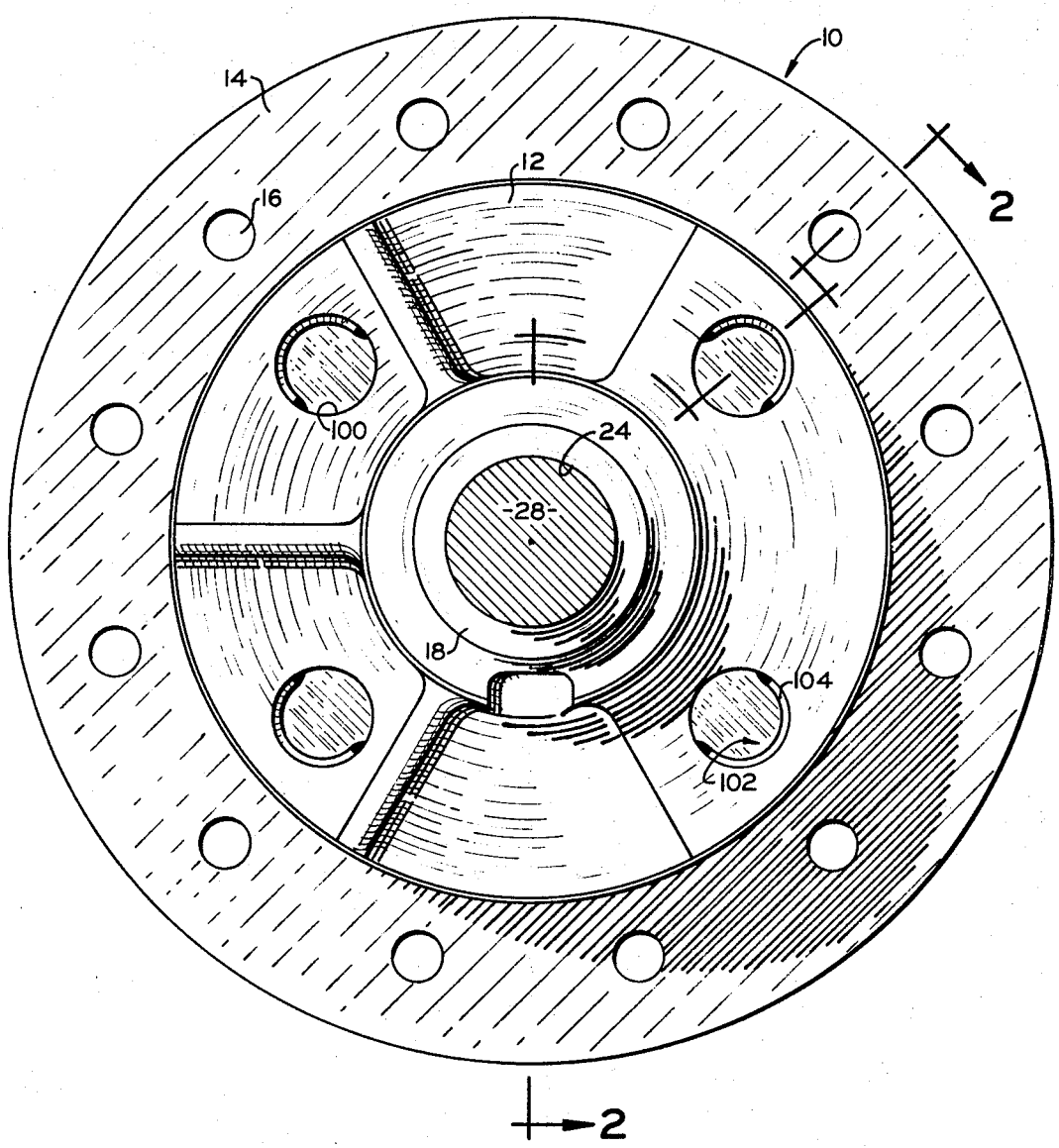
FIG. 1 is an end elevational view of a differential transmission embodying this invention.

In the preferred embodiment of this invention, the differential transmission has a housing which accommodates a differential gear train. The housing is rotatably driven by a suitable means such as a ring gear and rotatably and coaxially receives a pair of opposed axle shafts. The gear train comprises a pair of spaced coaxial side gears and a pair of pinion gears which are disposed intermediate to and in driving connection with the side gears. Each side gear is carried by the inner end of one of the axle shafts for unitary rotation therewith and axial movement relative thereto.

The pinion gears are rotatably mounted on a pinion shaft which is secured to the housing intermediate and perpendicular to the axle shafts. Clutch means comprising a plurality of interleaved friction disks is disposed between the housing and both of the side gears. Some of the friction disks are mounted for unitary rotation with and axial movement relative to the side gears while the remaining friction disks are adapted to rotate with the housing while being axially movable relative thereto. A plurality of coil springs are disposed in the housing with at least a portion thereof disposed in the space intermediate the side gears for imposing a first or initial biasing load on the clutch means.

The side gears are adapted to impose a second load on the clutch means whenever torque is transmitted thereto by the pinion gears as a result of the separating forces which arise due to the coaction of the intermeshing positive pressure angle teeth of the pinion and side gears. Pilot means are provided to connect the coil springs to the clutch means so that the springs may impose their biasing effect upon the clutch means independently of and without imposing their biasing load upon the side gears. These pilot means are also operative to pilot the friction disks, which are mounted for rotation with the case, relative to the case and to also pilot the coil springs relative to the case so that the disks and the springs do not wear upon or rotate relative to the case or to each other.

Referring now to the drawings, the differential transmission shown generally at 10 includes a hollow, one-piece housing 12 which is substantially cylindrical in configuration, has an axis of rotation 13, and includes an annular radially extending flange 14 having a plurality of bolt receiving openings 16 for the attachment of the usual ring gear (not shown). The housing 12 also has a pair of coaxial openings 22 and 24 formed therein which are each surrounded by an axially extending flange 18 and rotatably receive axle shafts 26 and 28 respectively. The one-piece housing 12 has a pair of radially opposed openings, one of which is shown at 34, which openings are provided to allow insertion and assembly of the differential transmission components in the housing, and, additionally, provide clearance for certain of the components contained within the housing as will be explained hereinafter.

A gear train 36 is operatively disposed within the housing 12 and comprises a pair of axilly spaced coaxial side gears 38 and 40 and a pair of radially spaced coaxial pinion gears, one of which is shown at 42, which pinion gears are each intermediate and intermeshed with both of the side gears. The side gears 38 and 40 each have an axially elongated annular hub 44, the outer end 45 thereof being rotatably received and piloted in a counterbore 46 formed coaxially with the openings 22 and 24; each hub having peripheral spur gear teeth 54 formed thereon adjacent the outer end 45 thereof. The side gears 38 and 40 are mounted on the axle shafts 26 and 28 respectively for rotation therewith and axial movement relative thereto by means of a splined engagement shown generally at 48. It should be noted that the outer ends 45 of the hubs 44 are axially spaced from the outer ends of the counterbores 46 so that the latter do not inhibit axial movement of the side gears 38 and 40.

The side gears 38 and 40 and the pinion gears 42 are respectively provided with intermeshed bevel gear teeth 50 and 52; the pressure angle of the teeth 50 and 52 is such that they are of the type commonly referred to as positive pressure angle teeth, so that the side gears 38 and 40 tend to move axially outward and the pinion gears 42 tend to move radially outward when torque is transmitted therebetween; such being hereinafter referred to as the separating action of the gear teeth.

Figure 2:
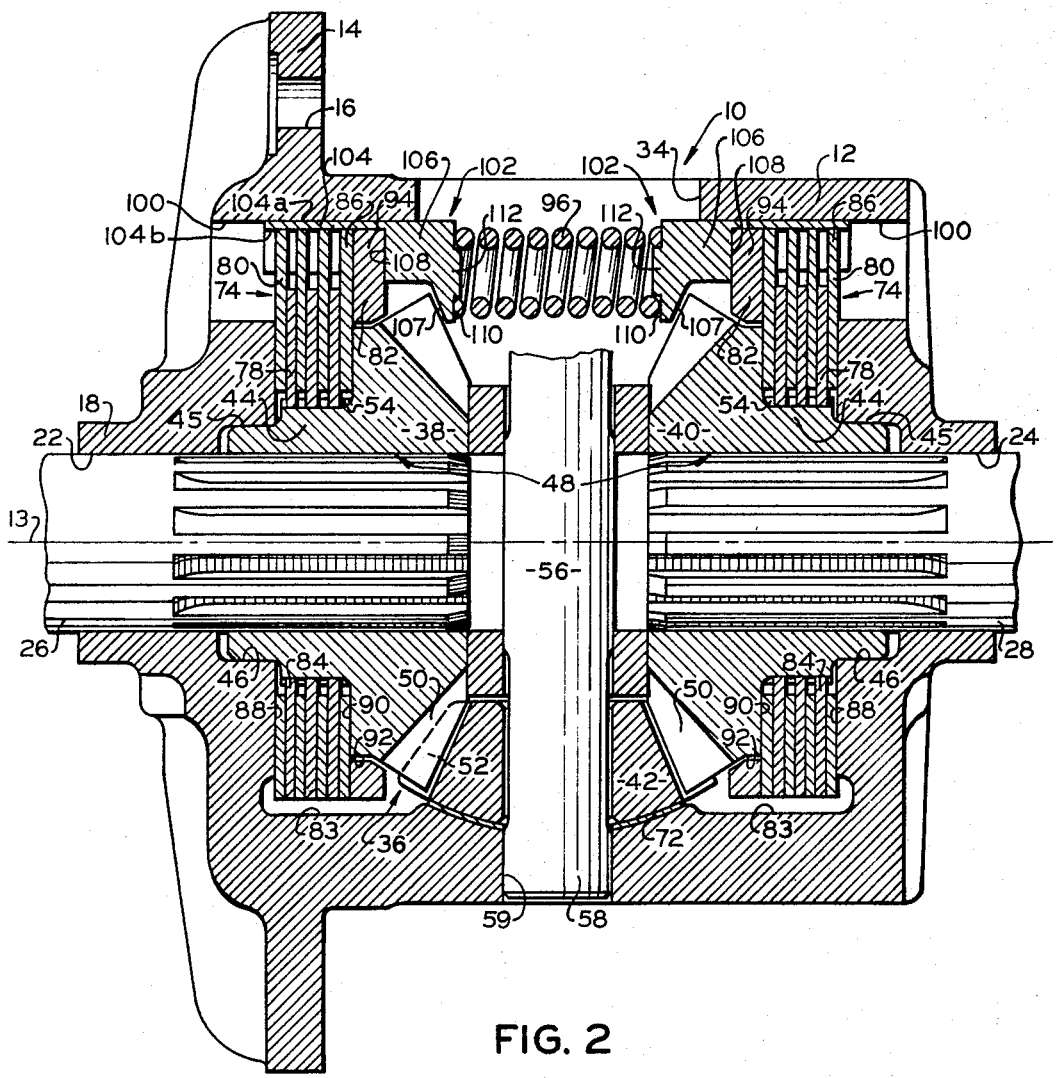
FIG. 2 is a view taken along the lines 2—2 of FIG. 1.

The pinion gears 42 are mounted for rotation about a radially extending pinion shaft 56 having the ends 58 thereof suitably fixed in a pair of radially aligned openings 59 formed in the housing 12. In FIG. 2, only one end 58 of the shaft 56 and one opening 59 are shown, and the circumferential midpoints of such openings are preferably displaced 90° from the circumferential midpoints of the access openings 34 in the housing 12; it being understood that the other opening 59 and the other opening 34 are diametrically opposed the respective openings 59 and 34 which are shown. The shaft 56 and the pinion gears 42 rotate unitarily with the housing 12 about the axis 13 of the latter, while the pinion gears are additionally operative to rotate about the shaft. Thrust washers 72 of suitable bearing material and configuration are mounted on the pinion shaft 56 intermediate and engaging the housing 12 and the outer face of the pinion gears 42, in a relatively frictionless manner, so as to limit the outward thrust of the pinion gears which results from the separating action of the gear teeth 50 and 52.

A pair of clutch means of the multiple disk type, each shown generally at 74, are provided to retard relative rotation of the components of the gear train 36 and thus retard the compensating or differential action of the same. While a pair of clutch means has been shown with one disposed between each side gear and the adjacent portion of the case, it should be understood that one clutch means disposed between one of the side gears and the case would also operate satisfactorily for limiting the compensating action of the differential. Each clutch means 74 includes a plurality of interleaved friction disks 78 and 80 and a thicker disk 82. The friction disks 78 surround the hub 44 of the side gears 38 and 40 and are mounted for unitary rotation with and axial movement relative to the side gears by means of internal teeth 84 on the disks which engage the external gear teeth 54 on the hubs. The friction disks 80 are interleaved with the disks 78, are substantially annular in form, are radially spaced from and surround the hubs 44 of the side gears 38 and 40, and have keys 86 projecting radially from their circumference. The interleaved disks 78 and 80 are interposed between the end walls 88 of the housing 12 and the axially outer faces 90 of the side gears 38 and 40 and adapted to be compressed therebetween upon outward movement of the side gears resulting from the separating action of the gear teeth 50 and 52.

The thicker disks 82, which are disposed axially inwardly of the disks 78 and 80 and functioning as pressure plates, are substantially annular in form and surround and are radially spaced from an annular shoulder 92 formed on the side gears 38 and 40 at a position axially outwardly from the teeth 50 thereof. The disks 82 are also provided with a plurality of radially projecting keys 94 aligned with the keys 86 of the disks 80 and are operative to engage the axially innermost friction disks, as shown in FIG. 2 the disks 80, and urge the disks 78 and 80 into engagement with each other and against the wall 88 of the housing 12. The disks 78 and 80 and the disks 82 are disposed in axially spaced coaxial cylindrical bores 83 formed in the housing 12, with the disks 78 being radially spaced from the bores.

A plurality of axially extending circumferentially spaced compression coil springs 96 are interposed between the pair of clutch means 74 and are operative to urge the disks 82 axially apart and outwardly so as to cause initial engagement of the disks 78, 80 and 82. In the preferred embodiment, four coil springs 96 have been utilized and are circumferentially equally spaced with a pair of springs disposed on either side of each pinion gear 42 and adjacent an access opening 34 in the housing 12; it being understood that a greater or lesser number of springs may be utilized accompanied by suitable alterations in the various components of the differential 10 cooperating therewith. The openings 34 are axially elongated so that the various components within the housing 12 may be assembled thereinto. Accordingly, the bores 83 in the housing 12, in the location of the openings 34, terminate at the openings, which termination is disposed axially outwardly of the springs 96.

The keys 86 and 94 of the disks 80 and 82 respectively, are circumferentially spaced at intervals, which correspond to the spacing of the coil springs 96 so that one key from each disk lies in an axially extending plane passing through a spring 96 and the axis of rotation 13 of the housing 12, while the center of the keys are spaced radially outwardly from the axial centerline of the springs.

Pilot means are provided to pilot the disks 80 and 82 and the springs 96 thereby inhibiting the same from wearing upon or rotating relative to the case 12 and relative to each other, and to impose the biasing effect of the springs on the disks 82 independently of the gear train 36. More particularly the housing 12 has four axially extending openings or keyways 100 formed therein, which openings are preferably formed by drilling the same completely through the walls 88 of the housing, so that the position and size of the openings is easily controlled and are not required to be cast therein so that casting tolerances would affect their size, finish or position. The openings 100 are circumferentially spaced at intervals which are equal to the spacing of the keys 86 and 94 and springs 96 and are spaced radially outwardly a sufficient amount so that the openings intersect the bores 83 and have cross-sectional configurations at such intersections which are substantially semi-circular, and have a diameter sufficiently large so as to be spaced from the keys 86 and 94 received therein; which keys, as shown, are of semicircular configuration. While this semicircular configuration of the openings 100 and the keys 86 and 94 is preferred for ease of manufacturing, it is understood that other configurations may be utilized without departing from the scope of this invention. In the area of the openings 34, the openings 100 are interrupted.

The pilot means includes a plurality of circumferentially spaced pairs of axially spaced pilot elements 102, with each element of a pair of elements being disposed at opposed ends of a spring 96. Each pilot element 102 has an axial elongated, axially outer portion 104 which is received in the opening 100 aligned therewith; the outer portion 104 being semi-annular in cross section and having an outer periphery 104a that cooperatively conforms to and slidably engages the opening 100 receiving the same and an inner periphery 104b which cooperatively conforms to and slidably engages the keys 86 and 94. Accordingly, the elements 102 are drivingly and pilotingly interposed between the housing 12 and the keys 86 and 94 in a wear resisting relationship and connected to the housing 12 for unitary rotation therewith while being axially slidable relative thereto. Since the contact area between the outer portion 104 and the opening 100 is relatively large, the unit pressure load on the opening is relatively small and does not subject the opening to wearing loads. The pilot element 102 may be hardened on its inner surface 104b to resist the wear of the keys 86 and 94 or the entire pilot element may be hardened or made from some suitable wear resistant material. Since these pilot elements 102 are relatively small and easily accessible, the wear resistance thereof is easily attained.

Each piloting element 102 has an axially inner portion 106, formed integrally with the outer portion 104, defining an axially outwardly facing shoulder 108 which terminates the outer portion 104 and abuts the key 94 disposed therein which key projects from the disks 82. The inner portion 106 projects out of the opening 100 receiving the pilot element 102 beyond the side gear 38 or 40, and terminates at its axially inner end in a cylindrical spring abutting surface 110, which surface is adapted to engage the outer end of the coil spring 96 cooperating therewith and has a piloting projection 112 extending therefrom into the center opening of the coil spring at the location of the periphery of the side gear 38 or 40 the inner portion 106 is of semi-cylindrical shape and spaced from the side gear, and at the location of the side gear teeth 50, the inner portion 106 is angularly relieved as shown at 107 and spaced from the teeth 50.

In this manner, the inner portion 106 of the pilot element 102 is piloted and positioned by the inner portion 104 thereof, the latter portion also piloting the keys 86 and 94 received therein, while the inner portion 106 pilots the coil springs 96 abutting the same at a position wherein at least a portion of the spring is disposed radially intermediate the side gears 38 and 40 and transmits the biasing effect of the spring to the clutch means 74. Since the pair of pilot elements 102 which engage the opposite ends of each spring 96 are disposed in the interrupted but axially aligned portions of a groove 100 in the housing 12, the opposite ends of the springs are maintained against relative rotation by the pilot elements 102 as well as the disks 78 and 82 being inhibited from rotation relative to each other, to the springs and to the housing 12.

It should be noted that with the arrangement described above, the coil springs 96 apply a biasing load upon the clutch means 74 which is independent of and separate from the load applied to the clutch means by the side gears 38 and 40 in response to the separating action of the gear teeth 50 and 52, and although a portion of each of the springs is disposed radially inwardly of the periphery of the side gears, the springs do not act upon the side gears and the biasing load thereof is applied to the clutch means 74 by the pilot elements 102 near the periphery thereof where it is most effective. With this arrangement, relatively large diameter springs 96 may be utilized without interfering with the housing 12 or the side gears 38 and 40 so that the housing need not be provided with unduly large openings 34 to accommodate the springs 96 when they are disposed in their operative position.

While only a single embodiment of this invention has been shown and described, it is apparent that many changes may be made therein without departing from the scope of this invention as defined by the following claims.

What is claimed is:

1. A differential transmission comprising in combination,
   (a) a housing having an axis of rotation,
   (b) a pair of axially spaced coaxial side gears disposed in said housing coaxially therewith and rotatable relative thereto,
   (c) pinion gear means disposed intermediate to and intermeshed with said side gears and having an axis of rotation disposed substantially normal to the axis of rotation of said housing,
   (d) means mounting said pinion gear means for rotation about its axis of rotation and drivingly connecting said pinion gear means for unitary rotation with said housing,
   (e) clutch means disposed between at least one of said side gears and said housing for inhibiting relative rotation of said side gears,
   (f) resilient means having at least a portion thereof disposed radially intermediate said side gears, and
   (g) pilot means mounted for unitary rotation with said housing by an axially outer portion of said pilot means radially interposed between said clutch means and said housing in a wear resisting and piloting relationship, said pilot means spaced from said side gears and operatively connecting said resilient means to said clutch means for imposing the load of said resilient means on said clutch means independent of said side gears while inhibiting relative rotation between said resilient means and said housing.

2. A differential transmission according to claim 1 wherein said clutch means has at least a component thereof mounted for unitary rotation with and axial movement relative to said housing, and said pilot means engages said component and inhibits relative rotation between said component, said housing and said resilient means.

3. A differential transmission according to claim 2 wherein said pilot means is axially elongated and has an inner portion integral with said outer portion, said inner portion engaging and piloting said resilient means and being spaced from said housing and side gears, said outer portion is piloted in said housing for unitary rotation therewith, whereby said pilot means pilots said resilient means and said component against rotation relative to said housing and to each other.

4. The combination with a differential transmission having
   (a) a rotatable housing having an axis of rotation,
   (b) a differential gear train operatively disposed in said housing and including a pair of axially spaced side gears disposed coaxially with said housing and a pair of pinion gears disposed intermediate to and intermeshed with said side gears,
      (1) the radial periphery of said side gears being spaced from said housing,
   (c) means connecting said pinion gears for unitary rotation with said housing and for rotation about their own axis,
   (d) clutch means disposed axially between at least one of said side gears and said housing and including first and second components adapted to be clutchingly engaged,
   (e) means mounting said first component for unitary rotation with said one side gear and rotation relative to said housing,
   (f) said second component being rotatable relative to said one side gear and adapted to be connected to said housing for unitary rotation therewith,
   (g) resilient means disposed axially intermediate and spaced from said side gears and having at least a portion thereof disposed radially inwardly of the periphery of said side gears, and
   (h) axially extending receiving means formed in said housing,
   (i) of an axially extending pilot means engaging said clutch means and adapted to move axially outwardly to load said clutch means,
      (1) said pilot means including integral axially inner and outer portions and being spaced from and extending peripherally of said one side gear,
      (2) said inner portion being spaced from said housing and pivotingly engaging an action end of said resilient means for unitary movement therewith and being biased axially outwardly thereby,
      (3) said resilient means biasing said pilot means axially outwardly to load said clutch means,
      (4) said outer portion being pilotingly received in said receiving means and engaging said receiving means over a substantial axial distance for unitary rotation with said housing,
(5) said inner portion pilotingly engaging said second component for unitary rotation about the axis of said housing,
(j) whereby said pilot means pilots said action end of said resilient means and said second component for unitary rotational movement with said housing and imposes the biasing load of said resilient means on said clutch means.

5. A differential transmission for differentially driving a pair of coaxial output shafts comprising in combination,
(a) a one-piece housing having
(1) an axis of rotation,
(2) a pair of opposed axially spaced clutch receiving bores therein,
(3) a radially extending access opening formed therein intermediate said bores for assembling the components of the differential transmission thereinto, and
(4) a pair of axially opposed output shaft receiving openings therein,
(b) a pair of axially opposed coaxial output shafts rotatably received in said last mentioned openings and having the inner end thereof projecting into said housing and being disposed in and spaced from said bores therein,
(c) a differential gear train disposed in said housing including a pair of axially opposed coaxial side gears and a pair of radially opposed coaxial pinion gears disposed intermediate and intermeshed with said side gears,
(1) each of said side gears being mounted on one of said output shafts for unitary rotation therewith and axial movement relative thereto, and
(2) the periphery of said side gears being radially spaced from said housing and said side gears being axially movable and rotatable relative to said housing,
(d) means drivingly connecting said pinion gears to said housing for unitary coaxial rotation therewith while allowing said pinion gears to rotate about their own axis to accommodate differential action of said differential gear train,
(e) a multiple disk clutch disposed coaxially with said housing in each of said bores, with one clutch cooperatively disposed between each of said side gears and said housing and extending circumferentially around a portion of said output shaft received in said bore,
(f) each of said disk clutches including
(1) a plurality of first disks having internal en-engaging means thereon, and
(2) a plurality of second disks, interleaved with said first disks, and each such second disk having a plurality of circumferentially spaced projections extending radially from the periphery thereof,
(g) means connecting said internal engaging means of each of said clutches with the cooperative of said side gears for unitary rotation and relative axial movement,
(h) each of said bores having a plurality of axially extending and crcumferentially spaced slots therein, with one slot being radially and circumferentially aligned with one of the projections on each of said second disks,
(i) a plurality of axially extending compression coil springs disposed axially intermediate said side gears and spaced from said housing,
(1) each spring having a radially inner portion thereof disposed radially inwardly from the periphery of said side gears and a radially outer portion disposed in said access opening and
(2) each of said springs having a pair of axially spaced reaction ends, and
(j) a plurality of circumferentially spaced pairs of axially spaced pilot means,
(1) each pair of said pilot means being cooperatively disposed with one of said coil springs,
(2) each of said pilot means of said pair of pilot means having an axially inner portion pilotingly engaging one of the reaction ends of the coil spring cooperating therewith and piloting said end for unitary movement therewith and being biased axially outwardly by said spring,
(3) said inner portions being disposed at the location of said access openings and spaced from said housing,
(4) each of said pilot means of said pair of pilot means extending axially outwardly from the inner portion thereof into a receiving means in one of said bores and being disposed between the periphery of said side gears and said housing and being spaced from said side gears,
(5) each of said pilot means having an axially outer portion pilotingly received in one of said axially extending receiving means for relative axial movement and unitary rotation therewith,
(6) the axially outer portion of each of said pilot means pilotingly engaging for relatively axial movement and unitary rotation one of the peripheral engaging means of each of said second disks disposed in said bore into which said pilot means is extending thereby drivingly connecting said second disks to said housing, and
(7) each of said pilot means having an axial engaging means thereon biasingly engaging one of said disks and operative to urge the same axially outwardly to cause the engagement of said clutches,
(k) whereby said pilot means pilots said springs and said second disks from rotating relative to each other and relative to said housing while transferring the biasing of said springs to said clutch and causing the engagement thereof.

6. The differential transmission of claim 5 wherein said pinion and side gears have intermeshed positive pressure angle teeth, and said side gears are urged axially outwardly by the separating action of said teeth to cause further engagement of said disks.

7. A differential transmission for differentially driving a pair of coaxial output shafts comprising in combination,
(a) a one-piece housing having
(1) an axis of rotation,
(2) a pair of opposed axially spaced clutch receiving bores therein,
(3) a radially extending access opening formed therein intermediate said bores for assembling the components of the differential transmission thereinto, and
(4) a pair of axially opposed output shaft receiving openings therein,
(b) a pair of axially opposed coaxial output shafts rotatably received in said last mentioned openings and having the inner end thereof projecting into said housing and being disposed in and spaced from said bores therein,
(c) a differential gear train disposed in said housing including a pair of axially opposed coaxial side gears and a pair of radially opposed coaxial pinion gears disposed intermediate and intermeshed with said side gears,
(1) each of said side gears being mounted on one of said output shafts for unitary rotation therewith and axial movement relative thereto, and
(2) the periphery of said side gears being radially spaced from said housing and said side gears being axially movable and rotatable relative to said housing, (d) means drivingly connecting said pinion gears to said housing for unitary coaxial rotation therewith while allowing said pinion gears to rotate about their own axis to accommodate differential action of said differential gear train, (e) a multiple disk clutch disposed coaxially with said housing in each of said bores, with one clutch cooperatively disposed between each of said side gears and said housing and extending circumferentially around a portion of said output shaft received in said bore, (f) each of said disk clutches including
   (1) a plurality of first disks having internal engaging means thereon, and
   (2) a plurality of second disks, interleaved with said first disks, and having a plurality of peripheral engaging means thereon, (g) means connecting said internal engaging means of each of said clutches with the cooperative of said side gears for unitary rotation and relative axial movement, (h) each of said bores having a plurality of axially extending receiving means therein with each receiving means being radially aligned with one peripheral engaging means of the clutch disposed cooperatively therewith and adapted to be drivingly connected thereto, (i) a plurality of axially extending circumferentially spaced compression coil springs disposed axially intermediate said side gears and each having at least a portion thereof disposed radially inwardly from the periphery of said side gears,
   (1) said springs having been compressed and positioned in said housing through said radially extending access openings, and having been compressed and positioned in said housing through said access opening,
   (2) said springs being circumferentially spaced at increments equal to said slots so that a plane extending through the axis of said housing and a central axis of said spring passes through one of said slots, and
   (3) each of said springs having a pair of axially spaced reaction ends, (j) a plurality of pairs of axially spaced pilot means,
   (1) said pairs of pilot means being circumferentially spaced at increments equal to said springs with one pair of pilot means cooperatively disposed with each of said springs,
   (2) each of said pilot means of said pair of pilot means having an axially inner portion pilotingly engaging one of the reaction ends of the coil spring cooperating therewith and piloting said end for unitary movement therewith and being biased axially outwardly by said spring,
   (3) said inner portions being disposed at the location of said access openings and spaced from said housing,
   (4) each of said pilot means of said pair of pilot means extending axially outwardly from the inner portion thereof into a slot in one of said bores and being disposed between the periphery of said side gears, and said housing and being spaced from said side gears,
   (5) the axially outer portion of each of said pilot means having a radially outer periphery which corresponds in shape to and engages the slot receiving the same for unitary rotation therewith and axial movement relative thereto and having a radially inner surface which corresponds in shape to and engages a projection on said second disk for unitary rotation therewith and axial movement relative thereto thereby drivingly connecting said second disk to said housing in a piloting and wear-resisting relationship, and
   (6) each of said pilot means having a radially extending shoulder biasingly engaging a projection on the axially innermost of said second disk and operative to urge the same axially outwardly to cause the engagement of said disk, (k) whereby said pilot means pilots said springs and said second disk from rotating relative to each other and relative to said housing while transferring the biasing of said springs to said clutch and causing the engagement thereof.

8. The differential transmission of claim 7 wherein said pinion and side gears have intermeshed positive pressure angle teeth and said side gears are urged axially outwardly by the separating action of said teeth to cause further engagement of said disks.

References Cited
UNITED STATES PATENTS

| | | | |
|---|---|---|---|
| 2,966,076 | 12/1960 | O'Brien | 74—710.5 |
| 3,097,545 | 7/1963 | Immel | 74—711 |
| 3,186,258 | 6/1965 | Meldola | 74—710.5 |
| 3,224,299 | 12/1965 | Holdeman et al. | 74—711 |
| 3,233,477 | 2/1966 | O'Brien | 74—710.5 |

FRED C. MATTERN, JR., *Primary Examiner.*

DAVID J. WILLIAMOWSKY, *Examiner.*

C. J. HUSAR, *Assistant Examiner.*